(12) United States Patent  
Cok et al.

(10) Patent No.: US 7,986,336 B2
(45) Date of Patent: Jul. 26, 2011

(54) IMAGE CAPTURE APPARATUS WITH INDICATOR

(75) Inventors: Ronald S. Cok, Rochester, NY (US); Chris W. Honsinger, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 1200 days.

(21) Appl. No.: 11/563,367

(22) Filed: Nov. 27, 2006

(65) Prior Publication Data

US 2008/0122919 A1 May 29, 2008

(51) Int. Cl.
*H04M 11/00* (2006.01)
(52) U.S. Cl. ..................... 348/14.01; 382/171
(58) Field of Classification Search .... 348/14.01–14.12; 382/171, 103; 455/556.2
See application file for complete search history.

(56) References Cited

U.S. PATENT DOCUMENTS

| | | | |
|---|---|---|---|
| 4,928,301 A | 5/1990 | Smoot | |
| 5,194,955 A | 3/1993 | Yoneta et al. | |
| 5,639,151 A | 6/1997 | McNelley et al. | |
| 5,777,665 A | 7/1998 | McNelley et al. | |
| 5,956,626 A * | 9/1999 | Kaschke et al. | 455/115.1 |
| 6,006,101 A * | 12/1999 | Sakamoto | 455/517 |
| 6,064,429 A * | 5/2000 | Belk et al. | 348/128 |
| 6,456,728 B1 * | 9/2002 | Doi et al. | 382/103 |
| 6,516,202 B1 * | 2/2003 | Hawkins et al. | 455/556.2 |
| 6,771,303 B2 | 8/2004 | Zhang et al. | |
| 6,841,780 B2 * | 1/2005 | Cofer et al. | 250/341.1 |
| 7,409,091 B2 * | 8/2008 | Sung et al. | 382/191 |
| 7,683,929 B2 * | 3/2010 | Elazar et al. | 348/169 |
| 2004/0017938 A1 * | 1/2004 | Cooper et al. | 382/171 |
| 2004/0196360 A1 | 10/2004 | Hillis et al. | |
| 2005/0024489 A1 | 2/2005 | Fredlund et al. | |
| 2005/0047647 A1 | 3/2005 | Rutishauser et al. | |
| 2005/0219393 A1 * | 10/2005 | Sugimoto | 348/333.01 |
| 2006/0161588 A1 * | 7/2006 | Nomoto | 707/104.1 |
| 2009/0002478 A1 * | 1/2009 | Ueki | 348/14.01 |

FOREIGN PATENT DOCUMENTS

| | | |
|---|---|---|
| EP | 1 158 786 | 5/2001 |
| EP | 1536645 | 1/2005 |
| WO | 02/076095 | 9/2002 |
| WO | 2006045441 | 5/2006 |
| WO | 2007/026269 | 3/2007 |

* cited by examiner

*Primary Examiner* — Curtis Kuntz
*Assistant Examiner* — Maria El-Zoobi
(74) *Attorney, Agent, or Firm* — Raymond L. Owens

(57) ABSTRACT

An integrated image capture apparatus for use in a two-way communication with a remote display, includes an image capture device for capturing still or video images including a system for sending the captured still or video images to the remote display and for receiving and displaying images from a remote location, a face recognition system provided in the integrated image capture device for detecting faces in the captured image; and an indicator responsive to face detection for indicating that a face has been captured by the image capture device.

2 Claims, 4 Drawing Sheets

IMAGE CAPTURE APPARATUS WITH INDICATOR

FIELD OF THE INVENTION

The present invention relates to two-way communication systems that include at least an integrated imaging apparatus with a camera and an indicator.

BACKGROUND OF THE INVENTION

Two-way video systems are available that include a display and camera in each of two locations connected by a communication channel that allows communication of video images and audio between two different sites. Originally, such systems relied on setup at each site of a video monitor to display a remote scene and a separate video camera, located on or near the edge of the video monitor, to capture a local scene, along with microphones to capture the audio and speakers to present the audio thereby providing a two-way video and audio telecommunication system between two locations. Such systems are typically large, fixed in location, have a restricted ability to cope with changes in scene focus, and do not necessarily provide natural communication. Moreover, these designs do not take advantage of available, portable display and capture systems such as are found in cellular telephones.

Referring to FIG. 5, a typical prior art two-way telecommunication system is shown wherein a first user 20a views a first display 14a. A first image capture device 10a, which can be a digital camera, captures an image of the first viewer 20a. If the image is a still digital image, it can be stored in a first still image memory 30a for retrieval. A still image retrieved from first still image memory 30a or video images captured directly from the first image capture device 10a will then be converted from digital signals to analog signals using a first D/A converter 40a. A first modulator/demodulator 50a then transmits the analog signals using a first communication channel 60 to a second display 14b where a second user 20b can view the captured image(s) on a display 14b.

Similarly, second image capture device 10b, which can be a digital camera, captures an image of second viewer 20b. The captured image data is sent to a second D/A converter 40b to be converted to analog signals but can be first stored in a second still image memory 30b for retrieval. The analog signals of the captured image(s) are sent to a second modulator/demodulator 50b and transmitted through a second communication channel 62 to the first display 14a for viewing by first viewer 20a. The first communication channel 60 may be the same as the second communication channel 60.

Although such systems have been produced and used for teleconferencing and other two-way communications applications, there are some significant practical drawbacks that have limited their effectiveness and widespread acceptance. Expanding the usability and quality of such systems has been the focus of much recent research, with a number of proposed solutions directed to more closely mimicking real-life interaction and thereby creating a form of interactive virtual reality. A number of these improvements have focused on communication bandwidth, user interface control, and the intelligence of the image capture and display components of such a system. Other improvements seek to integrate the capture device and display to improve the virtual reality environment.

There have been a number of solutions proposed for addressing the problem of poor eye contact that is characteristic of many existing solutions. With conventional systems that follow the pattern of FIG. 1, poor eye contact results from locating the video camera on a different optical axis than the video monitor and causes the eyes of an observed participant to appear averted, which is undesirable for a video communication system. Traditional solutions for addressing this problem, employing a display, camera, beam splitter, and screen, are described in a number of patents, including U.S. Pat. No. 4,928,301 entitled "Teleconferencing terminal with camera behind display screen" to Smoot; U.S. Pat. No. 5,639,151 entitled "Pass-through reflective projection display" and U.S. Pat. No. 5,777,665 entitled "Image blocking teleconferencing eye contact terminal" to McNelley, et al.; and U.S. Pat. No. 5,194,955 entitled "Video telephone" to Yoneta et al., for example. Alternately, commonly assigned U.S. Patent Application Publication No. 2005/0024489 entitled, "Image capture and display device" by Fredlund et al. describes a display device for capturing and displaying images along a common optical axis. However, all of these solutions are relatively expensive and may be difficult to implement in a portable format.

One difficulty with a number of conventional solutions relates to an inability to compensate for observer motion and changes in the field of view. Among approaches to this problem have been relatively complex systems for generating composite simulated images, such as that described in U.S. Patent Application Publication No. 2004/0196360 entitled "Method and apparatus maintaining eye contact in video delivery systems using view morphing" by Hillis et al. Another approach to this problem is proposed in U.S. Pat. No. 6,771,303 entitled "Video-teleconferencing system with eye-gaze correction" to Zhang et al. that performs image synthesis using head tracking and multiple cameras for each teleconference participant. These solutions are complex and may not be suitable for portable imaging and display devices or systems in which the location and orientation of the observers can vary greatly with respect to the location and orientation of the display or camera.

Video-conferencing systems incorporating sophisticated image analysis for improving usability and presence are known in the prior art. For example, EP1536645A1 entitled "Video conferencing system with physical cues" describes a system having robotic units that represents a remote conference participant. However, such systems are extremely complex and may not be suitable for small, portable systems. Face recognition algorithms that can identify and extract human faces in an image are also known, for example as described in U.S. Patent Application Publication No. 2005/0047647. Such techniques may be applied to image processing tasks, for example red-eye removal as described in WO2006045441 entitled "Method and Apparatus for Red-Eye Detection in an Acquired Digital Image."

The proliferation of solutions proposed for improved teleconferencing and other two-way video communication shows how complex the problem is and indicates that significant problems remain.

SUMMARY OF THE INVENTION

It is an object of the present invention to provide an improved apparatus that allows natural two-way communication, provides good viewer eye contact, and is suitable for portable application in hand-held devices.

In accordance with this invention, there is provided an integrated image capture apparatus for use in a two-way communication with a remote display, comprising:

(a) an image capture device for capturing still or video images including a system for sending the captured still or video images to the remote display and for receiving and displaying images from a remote location;

(b) face recognition system provided in the integrated image capture device for detecting faces in the captured image; and (c) an indicator responsive to face detection for indicating that a face has been captured by the image capture device.

The present invention provides a two-way communication system that makes use of an integrated imaging apparatus with improved, natural two-way communication and provides good viewer eye contact suitable for portable devices.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
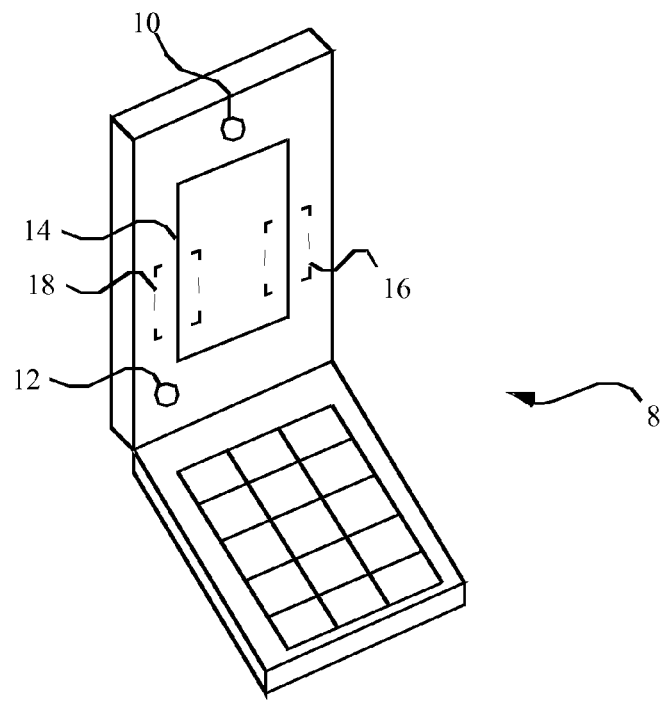
FIG. 1 is a perspective view of an integrated image capture apparatus according to an embodiment of the present invention.

Referring to FIG. 1, an integrated image capture apparatus 8 for use in a two-way communication system according to the present invention, includes an image capture device 10 for capturing images, a face recognition system 16 provided in the integrated image capture apparatus 8 for detecting faces in the captured images, and an indicator 12 responsive to the face recognition system 16 indicating when a face is found. According to an embodiment of the present invention, the integrated image capture apparatus 8 includes a display 14 for displaying images and includes electronic circuitry 18 for providing communications capabilities to transmit captured images to remote communication devices, for example a second integrated image capture apparatus 8, a display system, or a storage system. The electronic circuitry 18 may also include a storage device for storing captured or received images.

Electronic circuitry 18 for receiving and transmitting images are well-known in the art and may be found, for example in cellular telephones. Moreover, electronic circuitry for providing image storage is also found, for example in cellular telephones or digital cameras. Image capture devices 10 are likewise found in cellular telephones or digital cameras. The indicator 12 may be a light source, for example a light-emitting diode (LED) for providing a visual cue or a speaker for providing an audible sound cue, or both. Suitable display devices are also known, for example liquid crystal displays or organic light-emitting diode displays (OLEDs).

The face recognition system 16 can be image analysis algorithms implemented in digital electronic circuitry. The digital circuits can, for example, be a small computer or controller capable of executing a stored software program. Suitable programs are known in the art, for example and are commercially available.

Figure 2:
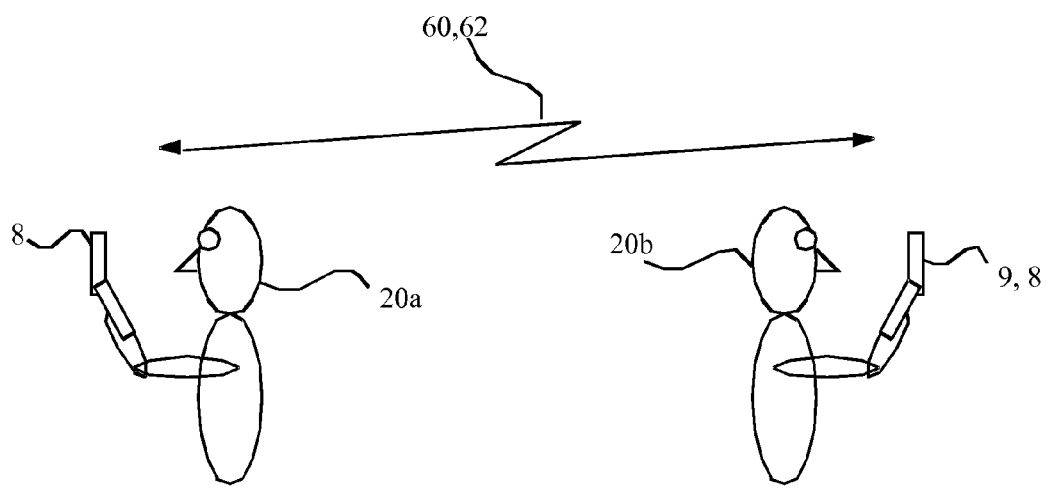
FIG. 2 is an illustration of a communication system according to an embodiment of the present invention.

Referring to FIG. 2, the present invention may be employed as part of a two-way communications system including the integrated image capture apparatus 8 including an image capture device for capturing images, face recognition system provided in the integrated image capture apparatus for detecting faces in the captured images, an indicator responsive to the face recognition system indicating when a face is found; a system for transmitting the captured images to a remote communication device 9 including a system for receiving the transmitted captured images, and a display for displaying the received captured images. According to the present invention, the integrated image capture apparatus 8 includes a system for receiving remotely captured still or video images and a display 14 for displaying the remotely captured images (as shown in FIG. 1). The remote communication device 9 itself is preferably an integrated image capture apparatus 8. The two-way communication system can employ any of a variety of techniques for example including one or more of a landline telephone, a cellular telephone, a computer having a network connection, a computer having an Internet connection, or a radio.

By employing the present invention users 20a and 20b can communicate visually, with increased ease, and with improved realism. In particular, the integrated image capture apparatus 8 can be a portable apparatus and, in particular, can be a handheld apparatus. By employing a portable apparatus, for example as embodied within a cellular telephone, two users can communicate visually in any of a variety of locations or while moving from one location to another. In such portable devices, display screens are typically very small and may be dedicated to providing a control interface or to display a remote scene or image of a remote user. When employed to display the image of a user, a natural communication interaction can be preferred in which the face of the user is displayed while speaking or otherwise using the face to communicate. However, there is conventionally no way to provide visual feedback or cues to the user to indicate that his or her face is being properly captured by the image capture device 10 for storage or viewing or that the communication with the remote user is proceeding satisfactorily. Hence, an additional indicator separate from the display is, according to an embodiment of the present invention, provided to indicate user's face is being properly captured by the image capture device 10 and transmitted to a remote location for viewing. If the indicator is on, the user can be confident that his or her face is being transmitted or stored and that a more natural communication interaction is provided. If the indicator is off, the user may re-orient the image capture device so that the face can be captured. By moving the image capture device until the indicator indicates that the user's face is captured, an improved communication interaction is provided. Alternatively, the user can position herself or himself until the indicator indicates that his or her face is being captured. Note that the present invention can also be employed when one user is holding a portable device according to the present invention for a second user. Since it is not always easy to be sure that one's image or that of another is being properly captured, the use of an indicator according to the present invention can improve the communication interaction. The present invention also provides a simple way for capturing and communicating or storing images of other objects or scenes, since the presence of a face is not required for communication.

In an alternative embodiment of the present invention, a portion of the display can be used as an indicator, for example in a split screen configuration. In other embodiments of the present invention, the face recognition system can extract a facial image from a captured image and communicates the extracted image to a second image capture and display device or to a storage device.

The image capture device 10 can be a video capture device and provide real-time images communicated to a remote viewing or storage location.

Figure 3:
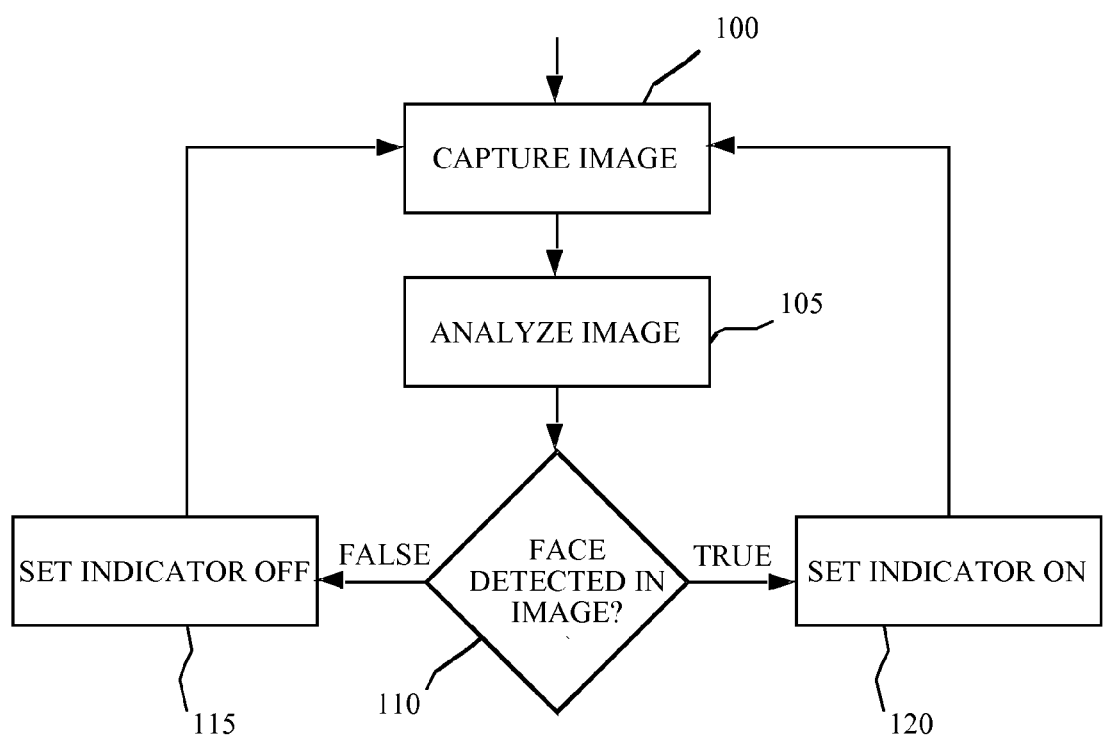
FIG. 3 is a flow diagram of the operation of an integrated image capture apparatus according to an embodiment of the present invention.

Referring to FIG. 3, the present invention can be operated by first capturing an image 100 using the image capture device. The captured image is analyzed 105 by the face recognition software. If the face recognition software detects a face in the image 110, the indicator is turned on 120. If the face recognition software detects a face in the scene, the indicator is turned off 115, and the process repeats. The face recognition software may be further controlled to require that a capture image includes a face of a certain size or orientation, to ensure that adequate communication interactions can proceed.

Figure 4:
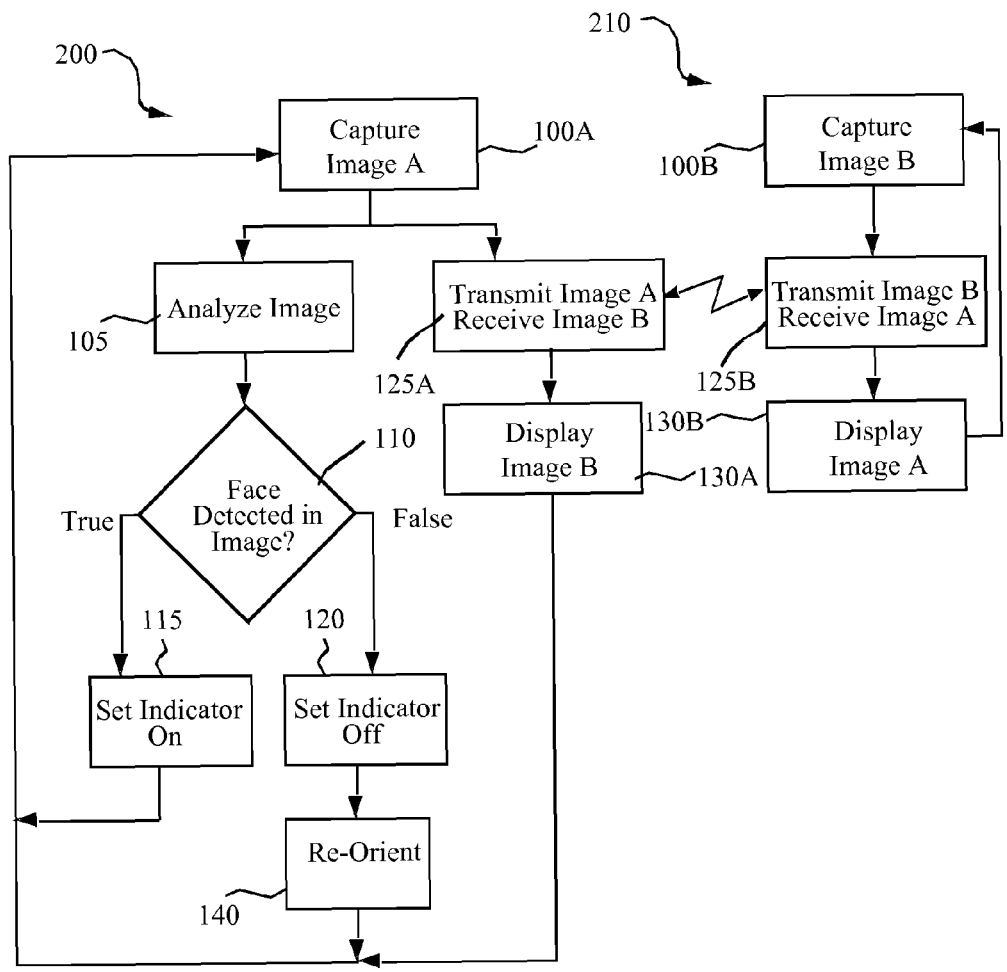
FIG. 4 is a flow diagram of the operation of a communication system according to an embodiment of the present invention.
Figure 5:
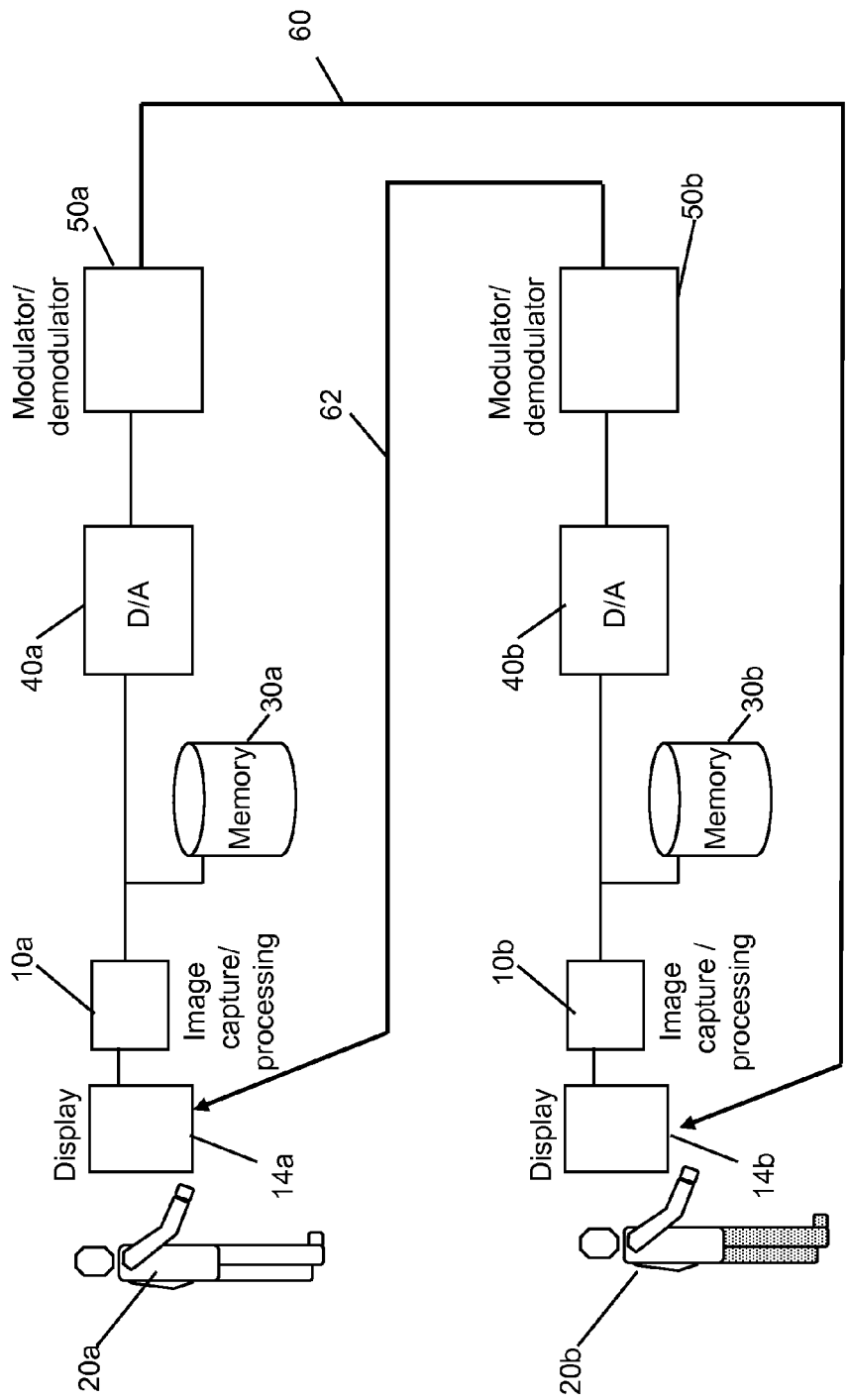
FIG. 5 is a block diagram of a typical prior-art telecommunication system.

Referring to FIG. 4, the operation of a communication system according to the present invention is illustrated. In this system, two interacting but independent devices are in operation. A first device operates 200 to capture images A and a second, remote, device operates 210 to capture images B. The first device captures 100A an image while the second device captures 100B a different image. The images A are analyzed 105 using the face recognition system and, if a face is detected 110, the indicator is set on 120, and if a face is not detected, the indicator is set off 115. If a face is not detected, the image capture device may be re-oriented 140 with respect to a user by moving the image capture device or the user. The images A and B can be transmitted and received 125A and 125B by the two devices. After the images are exchanged, they can be displayed 130A and 130B by the two devices, respectively, thereby enabling a more natural communication interaction.

The indicator of the present invention can be employed to further indicate that the transmission is proceeding correctly. In a communication system, multiple failures can be encountered in addition to a mis-orientation of the camera with respect to a user. For example, the call can be interrupted for some reason or the battery may fail. It is useful, therefore, for the indicator to indicate that all is well with the transmission of the correct data. Moreover, the indicator can also indicate that all is well with the reception and display, if one is employed, of information from a remote user.

The invention has been described in detail with particular reference to certain preferred embodiments thereof, but it will be understood that variations and modifications can be effected within the spirit and scope of the invention. It should be understood that the various drawing and figures provided within this invention disclosure are intended to be illustrative of the invention and are not to-scale engineering drawings.

PARTS LIST

| | |
|---|---|
| 8 | integrated image capture apparatus |
| 9 | remote communication device |
| 10, 10a, 10b | image capture device |
| 12 | indicator |
| 14, 14a, 14b | display |
| 16 | face recognition system |
| 18 | electronic circuitry |
| 20a, 20b | user |
| 30a, 30b | memory |
| 40a, 40b | D/A converter |
| 50a, 50b | modulator/demodulator |
| 60, 62 | communications channel |
| 100, 100A, 100B | image capture step |
| 105 | analyze image step |
| 110 | face detection test step |
| 115 | set indicator off step |
| 120 | set indicator on step |
| 125A, 125B | transmit/receive image step |
| 130A, 130B | display image step |
| 140 | re-orient step |
| 200 | operate device A steps |
| 210 | operate device B steps |

The invention claimed is:

1. An integrated image capture apparatus for use in a two-way communication with a remote display, comprising:
    (a) first and second image capture devices for capturing still or video images of first and second users, respectively, each image capture device including a display, the first image capture device remote from the second image capture device;
    wherein the first image capture device includes a system for sending the captured still or video images of the first user to the second image capture device and the second image capture device includes a system for receiving and displaying the captured still or video images of the first user; and
    wherein the second image capture device includes a system for sending the captured still or video images of the second user to the first image capture device and the first image capture device includes a system for receiving and displaying the captured still or video images of the second user;
    (b) face recognition system provided in each of the first and second integrated image capture devices for detecting faces in the captured image; and
    (c) a visual indicator in each of the first and second integrated image capture devices visually apparent to the first and second users, respectively, the visual indicator being responsive to face detection for indicating that a face has been captured by the image capture device, the visual indicator being located on the image capture device so that when an image of a user's face is captured by the image capture device the visual indicator is visible to the user.

2. A method of using an integrated image capture apparatus in a two-way communication with a remote display, comprising:
    (a) providing first and second image capture devices for capturing still or video images of first and second users, respectively, each image capture device including a display, the first image capture device remote from the second image capture device;
    wherein the first image capture device includes a system for sending the captured still or video images of the first user to the second image capture device and the second image capture device includes a system for receiving and displaying the captured still or video images of the first user; and
    wherein the second image capture device includes a system for sending the captured still or video images of the second user to the first image capture device and the first image capture device includes a system for receiving and displaying the captured still or video images of the second user;
    (b) recognizing faces in the captured still or video image in each of the first and second image capture devices; and
    (c) providing a visual indicator in each of the first and second image capture devices in response to face recognition for indicating to the first and second user that a face has been captured by the image capture device, the visual indicator being located on the image capture device so that when an image of a user's face is captured by the image capture device, the visual indicator is visible to the user.

* * * * *